United States Patent
Ims et al.

(10) Patent No.: US 6,665,867 B1
(45) Date of Patent: Dec. 16, 2003

(54) SELF-PROPAGATING SOFTWARE OBJECTS AND APPLICATIONS

(75) Inventors: Steven D. Ims, Apex, NC (US); Yongcheng Li, Raleigh, NC (US); Yih-Shin Tan, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 543 days.

(21) Appl. No.: 09/610,513

(22) Filed: Jul. 6, 2000

(51) Int. Cl.[7] .................................................. G06F 9/45
(52) U.S. Cl. ......................................... 717/173; 717/178
(58) Field of Search ................................... 717/173, 178

(56) References Cited

U.S. PATENT DOCUMENTS

| | | | | |
|---|---|---|---|---|
| 5,109,515 A | * | 4/1992 | Laggis et al. ................ | 707/10 |
| 5,630,066 A | * | 5/1997 | Gosling ........................ | 709/221 |
| 5,732,275 A | * | 3/1998 | Kullick et al. ................ | 717/170 |
| 5,802,367 A | * | 9/1998 | Held et al. .................... | 709/332 |
| 5,919,247 A | * | 7/1999 | Van Hoff et al. ............. | 709/217 |
| 6,049,671 A | * | 4/2000 | Slivka et al. .................. | 717/173 |
| 6,052,732 A | * | 4/2000 | Gosling ......................... | 709/229 |
| 6,202,207 B1 | * | 3/2001 | Donohue ....................... | 717/173 |
| 6,301,710 B1 | * | 10/2001 | Fujiwara ...................... | 717/175 |
| 6,347,398 B1 | * | 2/2002 | Parthasarathy et al. ...... | 717/178 |
| 6,393,470 B1 | * | 5/2002 | Kanevsky et al. ............ | 709/219 |
| 6,405,246 B1 | * | 6/2002 | Hutchison ..................... | 709/221 |
| 6,484,315 B1 | * | 11/2002 | Ziese ............................. | 717/173 |
| 6,563,514 B1 | * | 5/2003 | Samar ........................... | 345/711 |

* cited by examiner

*Primary Examiner*—John Chavis
(74) *Attorney, Agent, or Firm*—Jeanine S. Ray-Yarlette; Marcia L. Doubet

(57) ABSTRACT

The present invention provides a method, system, and computer program product that enables software objects and applications to dynamically self-propagate, as needed, through a computer network. This technique may be used to dynamically establish a mirroring site to which processing of work elements can be offloaded. In addition, this technique can be used to automatically deploy a software application that is comprised of a sender part and a receiver part (such as a client/server application) from a single site without manual intervention. The propagation occurs in an application-independent manner, and may operate symmetrically at either or both the sender and receiver. The life-span of propagated software objects and applications can be specified, in order to control the amount of time the downloaded resources reside on the receiving system. This technique is preferably built on a message queuing architecture, which is particularly advantageous for use when processing requests in an asynchronous execution mode.

38 Claims, 8 Drawing Sheets

```
    <parcel>
501 <priority>my priority</priority>
502 <deliverytime>delivery time</deliverytime>
        <parcelelement id="1121">
511   <servicename>phonebooklookup</servicename>
        <resources>
512   <resource>phonebookloopup.class</resource>
513   <resource>phonebooklookupresource.jar</resource>
        </resources)
514 <resourcesURL>http://www.PhoneResource.com/</resourcesURL>
515 <resourceversion> 1.1.0</resourceversion>
        <data>
          <dataelement>
            <param name="personname" value="LastName1, FirstName1"/>     522
          </dataelement>
          <dataelement>
520       <param name="personname" value="LastName2, FirstName2"/>     524
          </dataelement>
          <dataelement>
            <param name="personname" value="LastName3, FirstName3"/>     526
          <dataelement>
        </data>
        </parcelelement>
```

510

| FIG. 5A |
|---------|
| FIG. 5B |

FIG. 5B

```
        <parcelelement id="1122">
531   <servicename>bookorder</servicename>
        <resources>
532     <resource>bookorder.class</resource>
533     <resource>bookorderresource.jar</resource>
        </resources>
534   <resourcesURL>http://www.BookResource.com/</resourcesURL>
530 535 <resourceversion>7.5.0.2</resourceversion>
        <data>
          <dataelement>
            <param name="accountnumber" value="my account number"/> 541
540       <param name="password" value="my password"/> 542
            <param name="bookname" value="my book"/> 543
          </dataelement>
        </data>
        </parcelelement>
    </parcel>
```

FIG. 5C

```
550 <parcel>
  551 <priority>my priority</priority>
  552 <deliverytime>delivery time</deliverytime>
      <parcelelement id="1121">
        <data>
          <dataelement>
562         <param name="personname" value="LastName1, FirstName1"/>
            <param name="executionstatus" value="OK"/>
            <param name="phonenumber" value="1234567"/>
          </dataelement>
          <dataelement>
560       <param name="personname" value="LastName2, FirstName2"/>
564         <param name="executionstatus" value="OK"/>
            <param name="phonenumber" value="7654321"/>
          </dataelement>
          <dataelement>
566         <param name="personname" value="LastName3, FirstName3"/>
            <param name="executionstatus" value="name not found"/>
          </dataelement>
        </data>
      </parcelelement>

<parcelelement id="1122">
581     <servicename>bookorderstatustracking</servicename>
        <resources>
582       <resource>statustracking.class</resource>
583       <resource>statustrackingresource.jar</resource>
        <resources>
584     <resourcesURL>http://www.StatusTracking.com</resourcesURL>
580     <resourceversion>5.2.2</resourceversion>
        <data>
          <dataelement>
            <param name="bookname" value="my book"/>
            <param name="executionstatus" value="OK"/>
            <param name="payment" value="$12.34"/>
585         <param name="trackingnumber" value="40999"/>
          </dataelement>
        </data>
      </parcelelement>
</parcel>
```

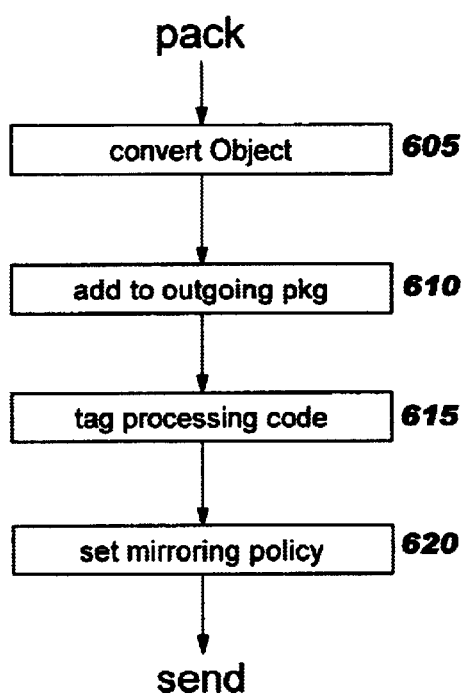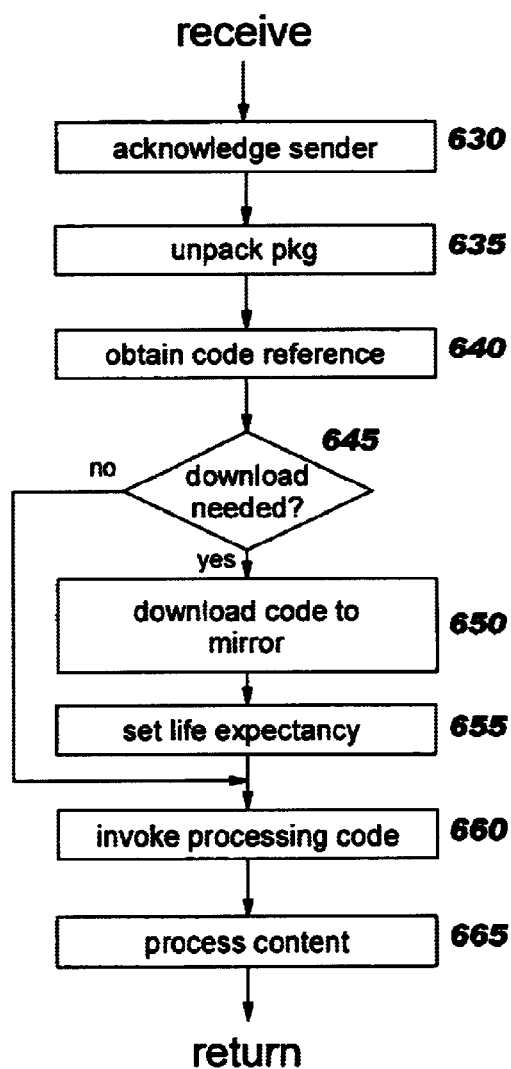

SELF-PROPAGATING SOFTWARE OBJECTS AND APPLICATIONS

RELATED INVENTIONS

The present invention is related to U.S. patent (Ser. No. 09/611,157), titled "Object Caching and Update Queuing Technique to Improve Performance and Resource Utilization", and U.S. Pat. No. 6,505,200 (Ser. No. 09/611,030), titled "Application-Independent Data Synchronization Technique", which are commonly assigned to the International Business Machines Corporation (IBM) and were filed concurrently herewith, and which are incorporated herein by reference.

BACKGROUND OF THE INVENTION

1. Field of the Invention

The present invention relates to computer software, and deals more particularly with a method, system, and computer program product that enables software objects and applications to dynamically self-propagate, as needed, through a computer network.

2. Description of the Related Art

Business and consumer use of distributed computing, also commonly referred to as network computing, has gained tremendous popularity in recent years. In this computing model, the data and/or programs to be used to perform a particular computing task typically reside on (i.e. are "distributed" among) more than one computer, where these multiple computers are connected by a network of some type. The Internet, and the part of the Internet known as the World Wide Web (hereinafter, "Web"), are well-known examples of this type of environment wherein the multiple computers are connected using a public network. Other types of network environments in which distributed computing may be used include intranets, which are typically private networks accessible to a restricted set of users (such as employees of a corporation), and extranets (e.g., a corporate network which is accessible to other users than just the employees of the company which owns and/or manages the network, such as the company's business partners).

The client/server model is the most commonly-used computing model in today's distributed computing environments. In this model, a computing device operating in a client role requests some service from another computing device operating in a server role. The software operating at one particular client device may make use of applications and data that are stored on one or more server computers which are located literally anywhere in the world. Similarly, an application program operating at a server may provide services to clients which are located throughout the world. A common example of client/server computing is use of a Web browser, which functions in the client role, to send requests for Web pages or Web documents to a Web server. Another popular model for network computing is known as the "peer-to-peer" model, where the requester of information and the provider of that information (i.e. the responder) operate as peers.

Whereas the HyperText Transport Protocol (HTTP) is the communications protocol typically used for communication between a client and a server in a client/server model, a protocol such as Advanced Program-to-Program Communication (APPC) developed by the IBM Corporation is typically used for communication in a peer-to-peer model.

Distributed computing provides a number of advantages which are well known and need not be described herein. However, there are shortcomings in the way that the computer systems exchange data in these prior art distributed computing techniques. In particular, the prior art requires that processing code is designed and implemented in pairs: one part for executing the client (or requester) functionality, and the other part for executing the server (or responder) functionality.

An example of the requirement for paired applications can be seen in the case where a Web page is to include an image file. Suppose the image is originally created, by the first of the two application "parts" (i.e. a creation part), as a file in the JPEG format. When a Web page which includes the image as an embedded JPEG image file is generated at a server and transmitted to a client for rendering, the client device must have the other "part" of the JPEG software (i.e. a rendering part) locally available in order to process the image for rendering at the client device. If the client does not have the proper software for processing (i.e. rendering) the received image file, then either the software must be obtained or the image cannot be rendered. Most users of distributed computing will be familiar with the frustration of a scenario of this type, where a file is received for which the local processing "part" is unavailable. In many cases, the user will not be able to determine where to obtain the missing part—or even what the missing part is.

Another common situation where the requirement for paired software becomes apparent is when a client device receives a "PDF", or Portable Document Format, file. A product such as Adobe Acrobat is typically used to create files of this type; a product such as Adobe Acrobat Reader is then used to view the file. By convention, application software that transmits a PDF file typically provides a message to the user containing information on how to obtain a copy of the Reader software if it is not already locally available on the user's computing device. However, the user must then take explicit action to obtain the Reader software, and becomes responsible for installing, configuring, and maintaining the software on his or her device.

While the examples provided above occur most frequently in a Web environment, this is merely for purposes of illustration: paired applications of one type or another exist whenever one computing device provides data or processing services for other device(s). For example, a book supply company may allow its customers to place orders electronically through its extranet, perhaps using a proprietary communications protocol. In this scenario, the customers' computing devices must have the software part installed which properly formats and transmits order requests, and the company's server(s) must have the software part installed which receives those requests and uses the information contained therein to complete the book ordering process. Only devices on which the customer's part of the application is installed are able to participate as customers of the book supply company.

Many more examples of paired applications will be obvious to one of skill in the art.

In the general case, the two parts of a paired application will execute on different physical computing devices. Each of the two parts thus needs to be explicitly distributed to each target device on which it is to operate, and must be installed on that device as well. If these processes have not been performed at a particular target device, then the application's functionality cannot be used at that device. If the software is subsequently revised, then the distribution and installation process must be repeated. Furthermore, once the software has been installed on a device, maintaining the software (for example, ensuring that the most recent version is available, and ensuring that obsolete or infrequently-used software does not waste storage space on the local device) typically becomes the responsibility of the device owner, who may or may not be capable of performing the necessary maintenance tasks. As will be obvious, when one or both of the parts of a paired application is to reside on a large number of devices, this prior art methodology results in a huge administrative burden that is expensive, time-consuming, and error-prone.

Applets provide one prior art technique for dynamically delivering application code to a target machine. However, this technique does not enable downloading data objects and code segments as part of an integrated application, and has several limitations which make it unsuitable as a general solution for distributing code in an application-independent manner. First, the well-known "Java sandbox" restriction, which is designed to prevent security problems when applets are downloaded, narrowly restricts the location of the code that can be executed. In particular, the class loader which downloads applets loads them into a namespace hierarchy that identifies the server and codebase which was the source of the download. When an applet executes, it is automatically restricted to interacting with server code on the source server, and within the corresponding codebase. The sandbox restriction also requires that a static data area is allocated for use by the code in the applet's namespace. For example, objects to be used by the classes (such as values for variables) are stored in this static data. If multiple requests for an applet are serviced from different servers and/or codebases, a separate and redundant instance of the code for each applet will be created, each of which must use a separate static data area.

Second, applets are downloaded in a "pull" mode using a synchronous communication model, meaning that the initiator (such as a requesting client browser) receives the code for execution in response to a request for delivery of the applet code to a single destination machine. There is no technique known to the inventors for asynchronously delivering code as applets using a "push" model (meaning that the initiator delegates the execution to another system). Third, the downloaded code is loaded into the browser's storage space, which limits accessibility to the code and requires allocation of static data areas, as stated above. There are no inherent mechanisms for enabling applets to automatically take advantage of cached data, and no management or system controls for automatically reclaiming the space used by an applet after a life-span of the code has been exceeded.

In addition, the applet model does not provide a technique for flexible and granular retrieval of objects and individual code segments, as part of an integrated distributed application. Furthermore, it may be desirable to offload part of a paired application for execution at a device other than the requesting client to which an applet must be loaded, in effect providing a "mirroring" site that may be used to balance the workload in a distributed environment: this is not possible given the inherent restrictions on which the applet model is designed. In addition, when a Web interface to legacy applications and data is to be provided through a Web browser, client code to provide access to the back-end legacy code and data cannot be downloaded for execution on a Web client using the applet approach due to the sandbox restriction.

Channel technology is another prior art technique for delivering code to a target machine. This technology does use a subscription model, but suffers from most of the disadvantages which have been described with reference to applets. For example, the subscriber's computer needs to pull periodically from the publisher's computer for updates. This is not as dynamic and efficient as if the publisher's computer can "push" the updates out to the subscriber automatically.

Thus, no suitable technique is known to the inventors for automatically and asynchronously transmitting data and the processing code of the parts of paired applications from one system to another in an application-independent manner.

Accordingly, what is needed is an improved technique for distributing software among computer systems in a distributed computing environment.

SUMMARY OF THE INVENTION

An object of the present invention is to provide an improved technique for distributing software among computer systems in a distributed computing environment.

Another object of the present invention is to provide this technique whereby the objects and/or software application code to be used in a distributed computing environment propagate, in an application-independent manner, to devices which need to use those objects and/or software application code.

Yet another object of the present invention is to provide a technique whereby a software application which sends a request to another process identifies, as part of the request, the objects and/or code needed to carry out the request.

Still another object of the present invention is to provide this technique whereby a software application which receives a request from another process automatically identifies, from the request itself the objects and/or code needed to carry out the request, and automatically obtains any objects and/or code which are not already locally available.

Another object of the present invention is to provide a technique for software which receives a response message to automatically identify, within the response, the data and code required for processing the response, thereby enabling object and code propagation to occur in a symmetric manner.

A further object of the present invention is to provide a technique for programmatically controlling the life-span of the automatically obtained objects and/or code.

Another object of the present invention is to provide a technique for facilitating business-to-business (and business-to-consumer) electronic commerce, whereby the software needed for an electronic transaction automatically propagates among the devices of the parties to the transaction in an application-independent manner.

Yet another object of the present invention is to provide a technique that facilitates dynamic offloading of work among computing systems by automatically propagating the required data and processing code to a device which is to perform the offloaded work.

Still another object of the present invention is to provide a technique wherein the propagated code operates to access legacy host data and applications.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a method, system, and computer program product for enabling software objects and applications to dynamically propagate through a computer network as needed, comprising: creating, by a requester, a request parcel comprising input data for processing a request and an identification and location information of one or more first code segments required for processing the input data; sending the request parcel to a receiver over the computing network; receiving the sent request parcel at the receiver; determining whether the identified first code segments in the received request parcel are locally available to the receiver, and for obtaining them using the location information in the request parcel if not, so that they become locally available; processing the request using the input data and the locally available first code segments, thereby creating a response; creating a response parcel comprising output data for the response and an identification and location information of zero or more second code segments required for processing the output data; sending the response parcel to the requester over the computing network; receiving the sent response parcel at the requester; determining whether the identified second code segments in the received response parcel, if any, are locally available to the requester, and for obtaining them using the location information in the response parcel if not, so that they become locally available; and processing the response using the output data and, when specified in the response parcel, the locally available second code segments.

The sending of the request and response parcels and the receiving of the request and response parcels preferably uses a message queuing system.

The request parcel and the response parcel may be specified using a markup language, which is preferably the Extensible Markup Language (XML).

Each of the request parcel and the response parcel may further comprise an identification and location information for one or more software objects which are to be stored at the receiver and the requester, respectively. In this case, the technique further comprises determining whether the identified software objects are locally stored and for obtaining them using the location information if not.

The request parcel may comprise a plurality of processing requests and the response parcel may comprise a plurality of processing responses. In this case, each processing request and processing response specifies an identifier which enables correlating a particular processing request with its associated processing response. Either or both of the request parcel and response parcel specify a life span for the identified first and second code segments: In this case, the technique further comprises removing the identified first code segments from local storage of the receiver when the life span of the first code segments is exceeded, and removing the identified second code segments from local storage of the requester when the life span of the second code segments is exceeded.

The technique may further comprise: comparing, when the determination of whether the first code segments are locally available has a positive result, whether a first resource version specified in the request parcel indicates that the locally available first code segments must be reloaded, and reloading them using the location information in the request parcel if so; and comparing, when the determination of whether the second code segments are locally available also has a positive result, whether a second resource version specified in the response parcel indicates that the locally available second code segments must be reloaded, and reloading them using the location information in the response parcel if so.

A mirroring site may be dynamically established, to which processing of work elements may be offloaded from another site. In this case, the request in the request parcel may be a refresh request for a read-access object, an update request for performing an update of a stored object, etc.

The present invention will now be described with reference to the following drawings, in which like reference numbers denote the same element throughout.

BRIEF DESCRIPTION OF THE DRAWINGS

FIGS. 5A and 5B depict an example of the format and syntax of a processing request that may be sent from one machine to another, including an identification of the objects and code needed for servicing the request, and FIG. 5C depicts an example of a response thereto, according to a preferred embodiment of the present invention; and FIGS. 6A and 6B provide flowcharts of the logic that may be used to implement a preferred embodiment of the present invention.

DESCRIPTION OF THE PREFERRED EMBODIMENT

Figure 1:
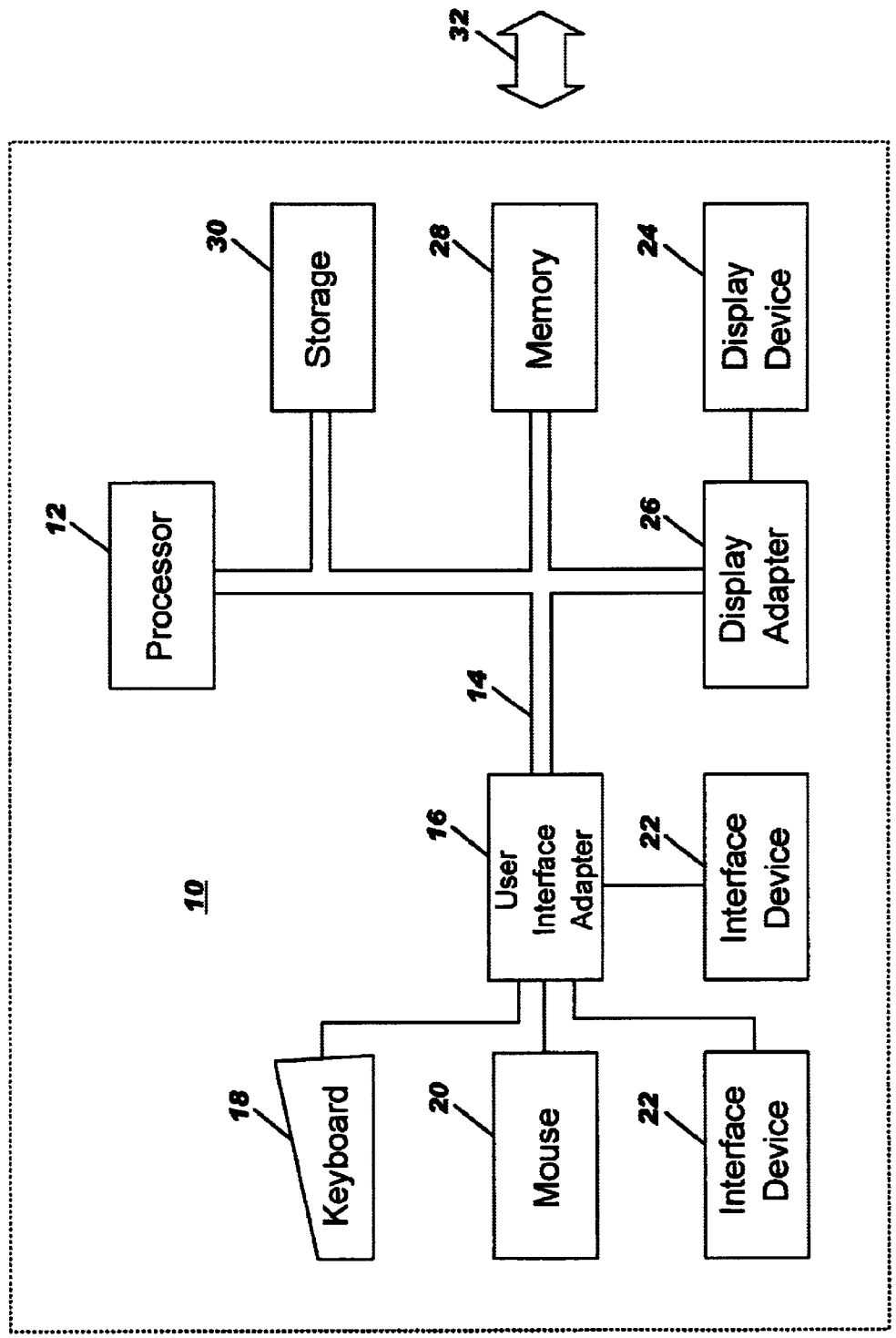
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate with other computers or networks of computers, for example via a communications channel or modem 32. Alternatively, the workstation 10 may communicate using a wireless interface at 32, such as a CDPD (cellular digital packet data) card. The workstation 10 may be associated with such other computers in a LAN or a wide area network (WAN), or the workstation 10 can be a client in a client/server arrangement with another computer, etc. All of these configurations, as well as the appropriate communications hardware and software, are known in the art.

The hardware environment of a server is well known in the art. The present invention may operate between a workstation and a server, or between a server and another server, where these types of devices may be connected by a network.

Figure 2:
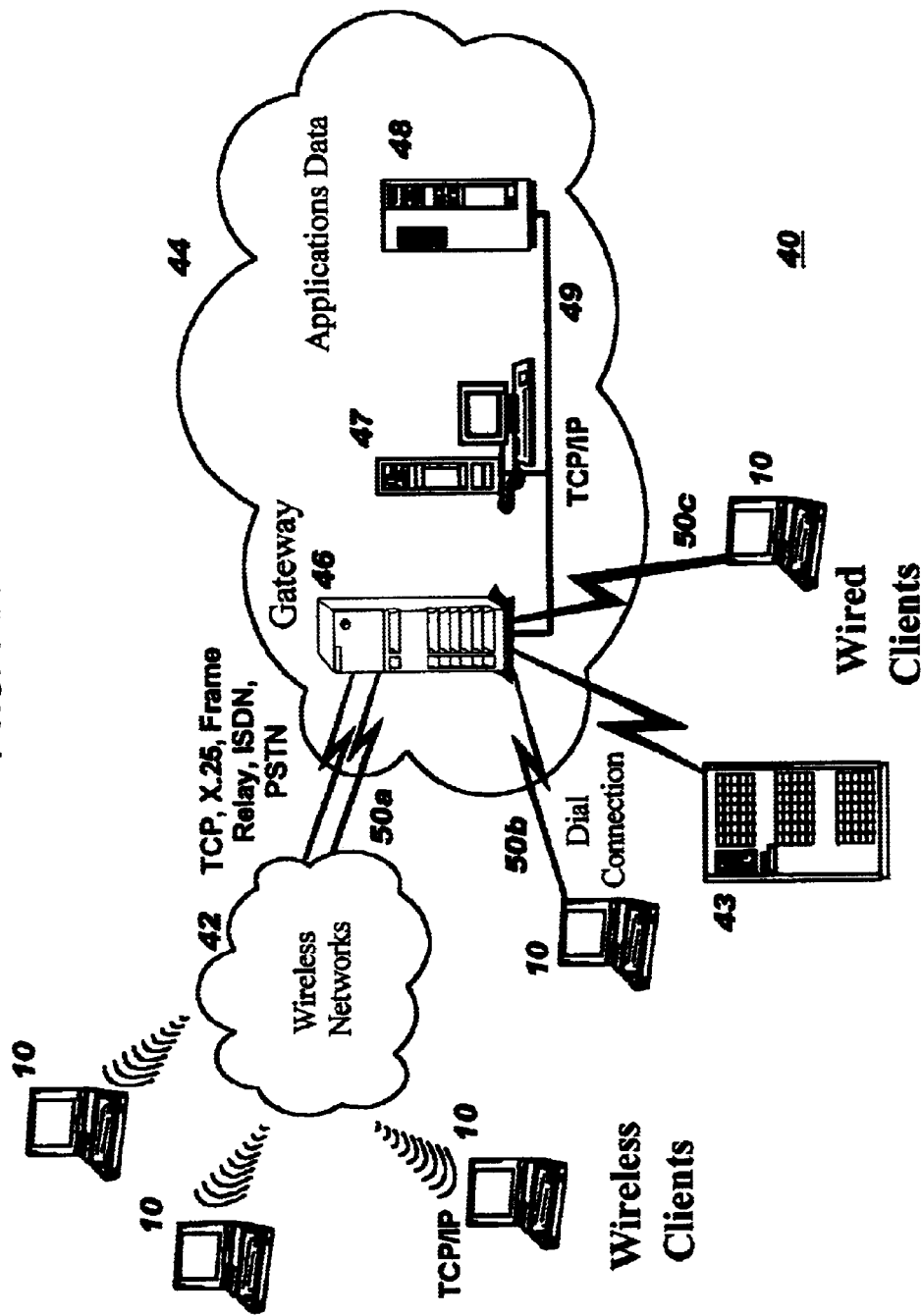
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and network 44, each of which may include a plurality of individual workstations 10 and a plurality of servers such as application data servers 43 and 47. Additionally, as those skilled in the art will appreciate, one or more LANs may be included (not shown), where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may also be directly coupled to one or more workstations 10 using a communications link 50b, 50c. The gateway computer 46 may be implemented utilizing an Enterprise Systems Architecture/370 available from IBM, or an Enterprise Systems Architecture/390 computer, etc. Depending on the application, a midrange computer, such as an Application System/400 (also known as an AS/400) may be employed. "Enterprise Systems Architecture/370" is a trademark of IBM; "Enterprise Systems Architecture/390", "Application System/400", and "AS/400" are registered trademarks of IBM. These are merely representative types of computers with which the present invention may be used.

The gateway computer 46 may also be coupled 49 to a storage device (such as data repository 48). Further, the gateway 46 may be directly or indirectly coupled to one or more workstations 10, and servers such as gateway 46 and application server 47 may be coupled to other servers such as server 43.

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in Texas, and one or more of the workstations 10 may be located in New York. The workstations 10 may connect to the wireless network 42 using the Transmission Control Protocol/ Internet Protocol ("TCP/IP") over a number of alternative connection media, such as cellular phone, radio frequency networks, satellite networks, etc. The wireless network 42 preferably connects to the gateway 46 using a network connection 50a such as TCP or UDP (User Datagram Protocol) over IP, X.25, Frame Relay, ISDN (Integrated Services Digital Network), PSTN (Public Switched Telephone Network), etc. The workstations 10 may alternatively connect directly to the gateway 46 using dial connections 50b or 50c. Further, the wireless network 42 and network 44 may connect to one or more other networks (not shown), in an analogous manner to that depicted in FIG. 2.

Software programming code which embodies the present invention is typically accessed by the microprocessor 12 (for example, of the workstation 10, server 43, gateway 46, and/or server 47) from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

The requesting and responding devices which make use of the present invention may be connected during transmission of the processing request, and during transmission of the response thereto, using a "wired" connection, or a "wireless" connection. Wired connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a Local Area Network (LAN) card such as Token Ring or Ethernet; using a cellular modem to establish a wireless connection; etc. The requesting computer may be any type of computer processor, including laptop, handheld or mobile computers; vehicle-mounted devices; desktop computers; mainframe computers; etc., having processing and communication capabilities. The responding computer, similarly, can be one of any number of different types of computer which have processing and communication capabilities. These techniques are well known in the art, and the hardware devices and software which enable their use are readily available. (The requesting computer is referred to alternatively herein as the "requester" or "client" for ease of reference, although the requester may be a server machine operating as a client for a particular request/response scenario, and/or may alternatively be operating in a peer-to-peer or other network model. The responding computer is referred to alternatively herein as the "responder" or the "server", for ease of reference.

In the preferred embodiment, the present invention is implemented as computer software. This software provides an applicant-independent technique for automatically distributing data and/or processing code from one computing system to another. This technique can be used advantageously for distributing the processing logic of paired applications, thereby dynamically enabling the recipient device to participate in an application with the sending device, and also provides an efficient way to offload processing of work elements from one system to another which may or may not have the data and code required for the offloaded work elements already installed. A technique for programmatically controlling the life-span of the dynamically distributed data and code is provided, to lessen the administrative burden on the recipient.

The preferred embodiment of the present invention will now be discussed in more detail with reference to FIGS. 3 through 6.

The present invention provides a "parcel service" which is used to transport requests, along with an identification of objects and/or code needed to process the request, to a receiver of the request. The same approach is used for transporting the resulting responses, whereby an identification of any objects and/or code needed to process the response are transported to the receiver of the response. As previously stated, for ease of reference, the source of a request will be referred to herein as a client, and the source of a response will be referred to as a server, although this is not meant to limit use of the present invention to client/ server computing models and is not meant to limit the present invention to requests which originate with single-user client workstations. (As previously stated, the present invention may be used advantageously between two machines which typically function as servers.)

This parcel service may be used to dynamically establish a "mirroring" site which can be used for offloading work from another site. This mirroring technique may be used advantageously, for example, for offloading the processing of cached work requests of the type described in U.S. patent (Ser. No. 09/611,157, filed Jul. 6, 2000), titled "Object Caching and Update Queuing Technique to Improve Performance and Resource Utilization" and/or U.S. Pat. No. 6,505,200 (Ser. No. 09/611,030, filed, Jul. 6, 2000), titled "Application-independent Data Synchronization Technique". These patents are referred to hereinafter as "the related inventions".

In the preferred embodiment, the parcel service is built upon a commercially-available message queuing (MQ) service, such as the MQSeries® product from IBM or Microsoft Corporation's Message Queue (MSMQ) product. ("MQSeries" is a registered trademark of IBM.) Message queuing is a technique whereby application programs communicate with each other using messages and queues. In the general case, message queuing may be used with applications which are running on the same computer, or on different computers, and which may use the same or different operating systems. When one application wishes to send a message to another application, it passes the message to a queue manager, which then forwards the message to the queue manager used by the target application. The target application then retrieves the message by making a request of its queue manager. The format of the message is understood by both applications, so that they can interpret what actions may be required for the message contents. When the applications are running on the same computer, they typically use a shared queue manager; when the applications are on different computers, each computer may use a different queue manager. This message queuing approach enables message exchange to occur asynchronously, because the application generating the message does not need to await an acknowledgement from the target application. This, in turn, also allows the message sending process to operate very quickly.

Figure 3:
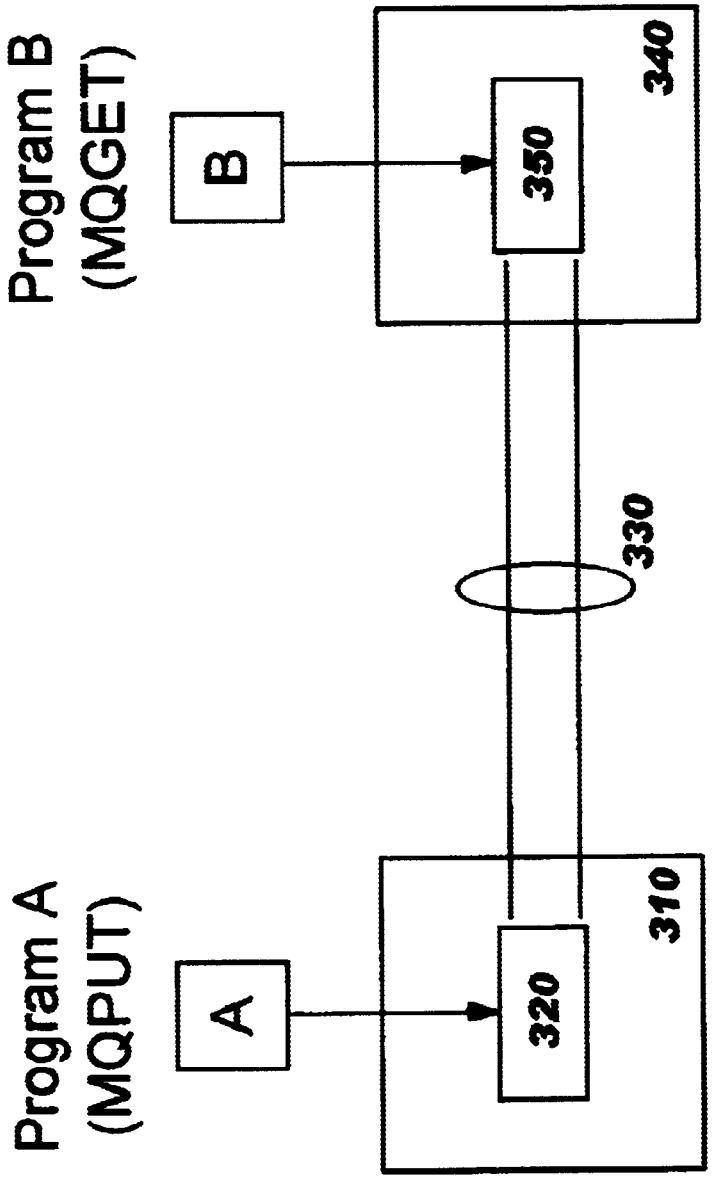
FIG. 3 depicts a prior art message queuing architecture that may be adapted for use with the present invention to provide reliable delivery of requests for processing and responses thereto.

FIG. 3 depicts, at a high level, an example of the components and message flows used by MQSeries. The sending queue and receiving queue are typically implemented as First-In, First-Out (FIFO) queues. With a FIFO implementation, messages are queued for transmission (and subsequently transmitted) in the order in which they are sent to the queuing system by the sending application; on the receiving side, the messages are stored in the queuing system in the order in which they are received from the network, and delivered to the application in this same order. MQ systems of the prior art include an interface that supports commands such as "queue" and "dequeue", "put" and "get", or other equivalent syntax that conveys a request to put a message into the message queue and retrieve it from the queue, respectively. When Program A wishes to transmit a message to Program B, Program A issues an MQPUT message call which specifies a destination queue accessible by Program B. The queue manager 310 to which Program A is connected puts the message onto a special queue called a transmission queue 320. The message is then automatically sent along a channel or "MQ pipe" 330 connecting the two queue managers (assuming that the channel is currently established and available). Upon receipt of the message by the destination queue manager 340, it is put onto the destination queue 350. Program B subsequently retrieves the message from this queue by issuing an MQGET call. (Reference may be made to "IBM Messaging and Queuing Series—Technical Reference" (SC33-0850-01, 1993) for a more detailed description of messaging and queuing using MQSeries.)

The message queuing architecture and message queuing software is used by the present invention for communicating between the requester and responder, using existing features to create an MQ pipe between the communicating processes. An MQ approach is preferable because it provides built-in reliable, once-only delivery of messages which may be queued for asynchronous processing. Alternatively, the parcel service can be constructed on top of a networking protocol such as HTTP or HTTP-S, the Internet InterORB Protocol (IIOP), or Sockets by providing message queuing extensions for messages received using those protocols.

The MQ approach of the preferred embodiment is particularly advantageous where communication is asynchronous (although this technique may be adapted for providing synchronous message exchange, in a proper environment). As an example of using the present invention in an asynchronous communication mode, low-priority processing requests (e.g. daily purchase orders, where the orders are not considered time-critical) may be queued for processing at a later time when the receiving computing system is lightly loaded. This scenario is common in "branch office" environments, where the computing devices within a branch office (or some analogous subset) of an enterprise may be connected together using a LAN or similar network, and where the branch's daily work is accumulated for transmission to the back-end enterprise system for processing after the branch closes for the day. As another example, this mode may be used advantageously where the client is an occasionally-connected mobile computing device which transmits requests while connected to a server and then disconnects, and will typically receive the server's responses during some (arbitrarily-timed) subsequent connection.

In the preferred embodiment of the present invention, a general purpose MQ message scheduling application (described below with reference to FIG. 6) is installed on both the sending and receiving ends of a network connection, and maintained as a common pipe for exchanging messages between the parts of paired applications. These paired applications may be written, for example, in an object-oriented programming language such as the Java™ programming language. ("Java" is a trademark of Sun Microsystems, Inc.) The processing code which is invoked in the requester part of a paired application may function as a front-end to access legacy host applications and data, thereby providing a Web portal into legacy applications through a Web browser interface. In this situation, the legacy host applications may be written in procedural programming languages (such as COBOL, etc.) and may perform services such as database retrieval and update operations. The code which is dynamically propagated by the present invention may include macros or scripts, of the type described in the related inventions, for interacting with a legacy application. For example, a propagated script may perform a host interaction or screen-scraping process, where the back-end system may be a CICS® (Customer Information Control System) or APPC application. ("CICS" is a registered trademark of IBM.)

Figure 4:
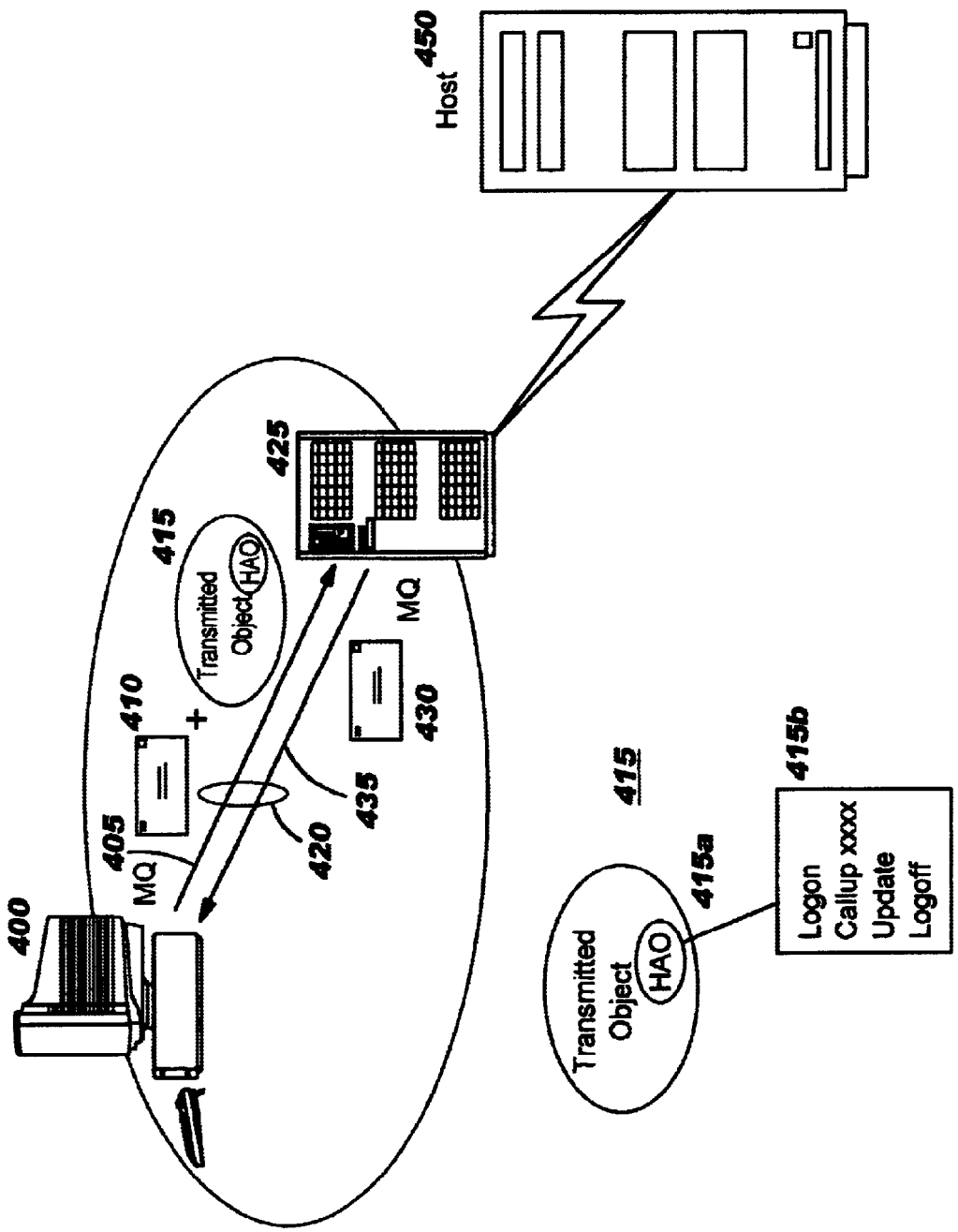
FIG. 4 illustrates an example of the components and flows involved in sending a processing request from one machine to another, along with information regarding the objects and code needed to service the request, according to a preferred embodiment of the present invention.

FIG. 4 depicts an example of the components and flows involved in sending 405 a processing request 410 from a client 400 to a server 425 using an MQ pipe 420, along with information 415 regarding the objects and code needed to service the request, according to a preferred embodiment of the present invention. This particular processing request is illustrated in more detail at elements 415a, 415b, which show that the transmitted object 415 includes a Host Access Object (HAO) 415a of the type described in the related inventions, where the script 415b in this HAO performs the steps of logging onto a legacy host system; invoking a legacy host application called "Callup" and passing some parameter "xxxx" to this application; doing an update of some sort; and then logging off of the legacy host system. A host machine 450 is depicted, where the legacy host application and data presumably reside. The Callup application which is used as an example herein accesses a telephone directory data repository using a parameter such as a person's name as an index into the stored data. When script 415b is executed by server 425 after the propagation process to invoke the Callup application on host 450, the information which is located and updated using the parameter "xxxx" may be transmitted from host 450 to server 425, which will then use this information to create a response 430. Response 430 is then returned 435 using MQ pipe 420 to the client 400.

FIGS. 5A and 5B illustrate an example of the format and syntax of a parcel 500 containing a processing request that may be sent from a client to a server, where this request identifies the objects and code needed for servicing the request, according to a preferred embodiment of the present invention. FIG. 5C illustrates a parcel 550 containing a response to this request that may be sent from the server to the client, where the response message also identifies objects and code needed to process the response. In this manner, the self-propagation technique of the present invention may be used in a symmetric fashion, providing a much more powerful and flexible process than one-way automated distribution techniques (such as applet downloading) which are known in the art.

In the preferred embodiment, the Extensible Markup Language (XML) is used for the request and response message parcels, in order to provide a common well-formed invocation format that is widely supported in the Web environment. (Alternatively, other notations such as other markup notations derived from the Standard Generalized Markup Language, or "SGML", may be used without deviating from the scope of the present invention.)

According to the preferred embodiment, a parcel defines the information needed for data delivery and service invocation. A request parcel preferably comprises the following information elements: (1) a package priority (see element 501 of FIG. 5 for an example); (2) a package delivery time (see element 502); (3) one or more parcel elements (see elements 510 and 530); (4) the name of a service to be performed for a parcel element (see elements 511 and 531); (5) the names of one or more resources to be used when performing each service (see elements 512–513 and 532–533); (6) a Uniform Resource Locator (URL) from which the resources can be dynamically downloaded, if not already locally available (see elements 514 and 534); (7) a resource version value (see elements 515 and 535); and (8) input data that is needed to run the service (see elements 520 and 540).

A parcel priority applies to an entire parcel, and may be used in an implementation-specific manner to schedule the execution of the services referenced therein. For example, priority may be assigned using classifications such as high, medium, and low. An example of parcel priority is depicted at element 501 of request parcel 500 in FIG. 5A, and at element 551 of response parcel 550 in FIG. 5C. When queued parcels are to be retrieved from the message queue for processing, the highest priority parcels will then be retrieved (and scheduled for execution) first. (If a particular implementation of the present invention has no need or desire to use priority in retrieving queued messages, then support for the priority element may be omitted, or all parcels may be treated as having identical priority. As will be obvious, this support should not be omitted if a general solution is to be implemented which must receive and process requests for multiple priorities where the priority indication is significant.) Parcel 500 indicates at tag 501 that an arbitrary priority classification syntax which is understood by the parcel sender and parcel receiver may be used, if desired.

A parcel delivery time also applies to an entire parcel. Examples of specifying parcel delivery time are shown at elements 502 (for a request parcel) and 552 (for a response parcel). This element may be used advantageously to enable deferred or delayed processing of the type which has been previously described with reference to branch office scenarios and disconnected-mode operation for mobile computing devices. Using this delivery time element, a processing request or response can be queued as a parcel at a time which is convenient to the client, while the actual processing of the request or response will not be carried out until the time indicated by the value of the delivery time element. The parcel delivery time may by specified using an implementation-specific syntax, as indicated in the value of tags 502 and 552.

The example request parcel 500 in FIGS. 5A and 5B includes two parcel elements 510 and 530, each of which requests a different service for objects of different types. The ability to package together disparate processing requests of this type is a feature of the generic parcel approach defined herein; however, a particular implementation may choose to create separate parcels for each distinct type of service (or for each distinct set of resources to be used, etc.), if desired. Preferably, each parcel element tag in a request parcel or response parcel includes an "id" attribute which has a value that may be used to automatically correlate the particular processing request and its response. For example, the attribute value of "1121" is specified for the first parcel element 510 of the sample request parcel in FIG. 5A, and an identical attribute value is specified for the first parcel element 560 of the sample response parcel in FIG. 5C, thereby indicating that the response parcel element 560 contains output information associated with the processing requested in element 510. Preferably, the attribute values are programmatically generated by the software which creates the parcels, which is discussed in detail below with reference to FIG. 6.

The service to be invoked for the data in the first parcel element 510 of the example is a phone book lookup (see element 511), such as that described above with reference to script 415b. The resources which are needed locally for servicing this request are indicated in the resource tags 512, 513 as a particular class file and jar (Java Archive) file, respectively. If those resources are not already available on the server which receives parcel 500, they can be obtained automatically using the URL specified in tag 514, thereby dynamically propagating a processing capability for these resources and enabling the parcel recipient to serve as a mirroring site which can be used to offload the processing for the specified service (in this case, to perform phone book lookup processing).

The resource version element 515 for the phone book lookup service of parcel 510 is set to "1.1.0" in this example. This version element is optional, and may be used according to the preferred embodiment to enable determining whether any previously-cached versions of the resources which may exist on the local system are obsolete and should therefore be forced to reload. For example, in a scenario where it is necessary that the service is performed on the most up-to-date version of an object, reflecting any changes that may have been made to the object in a back-end repository, this version element may be set to a value which will automatically force a current copy of the object to be loaded. In the preferred embodiment, when the value of a resource version specified in a parcel is greater than the resource version of a locally-available resource, then the locally-available resource is reloaded using the associated URL from the parcel.

Finally, the input data in a request parcel is structured as one or more data elements. In the preferred embodiment, each data element specifies the data to be used for a single invocation of the requested service. A generic tag syntax is preferably used, where a tag name such as "param" is used along with generic attributes having identifiers such as "name" and "value". This generic syntax facilitates application-independent data transfer. In the example, the input data for parcel element 510 is specified at 520 as a "<data>" element having 3 child elements (522, 524, 526). Each child element specifies input data to be used on a single invocation of the phone book lookup service, and is expressed as 3 parameter ("<param>") elements where the values of the name and value attributes correspond to 3 sets of first and last names to be used in accessing a stored phone book directory. In other words, the information stored in the phone book repository for 3 different people is to be accessed.

The second parcel element 530 specifies a different service (see 531), which in this case is placing an order for a book. The resources that are required for this service are specified at 532 and 533, along with a URL 534 which may be used to download them if necessary. This example includes a single data element 540 expressed as 3 parameter elements, each having name and value attributes. The attribute values in the parameter elements provide an account number 541 and password 542 (presumably for the person placing the order), along with the name 543 of a book to be ordered.

A response parcel, such as parcel 550 in FIG. 5C, preferably comprises the following information elements: (1) a package priority (see element 551 of FIG. 5C for an example); (2) a package delivery time (see element 552); (3) one or more parcel elements (see elements 560 and 580); and (4) output data that is being returned as a result of running the service identified in the request parcel (see elements 562, 564, and 566 for the output data associated with parcel element 560).

Optionally, when particular processing must be applied to the response parcel by its receiver, a response parcel created according to the present invention includes a specification of the resources to be used for that processing. Response parcels therefore have the capability to provide code propagation in a manner which is symmetric to that of request parcels, enabling any data formatting and processing requirements of the response parcel to be automatically resolved for the response parcel recipient. Use of the optional resource specification capability has been demonstrated in the example response parcel in FIG. 5C, where resources have been specified for parcel element 580 but not for parcel element 560. When this resource specification capability is used, the response parcel may further comprise: (5) the name of the service to be performed for a parcel element (see element 581 of parcel element 580 for an example); (6) the names of one or more resources to be used when performing each service (see elements 582 and 583); (7) a URL from which the resources can be dynamically downloaded, it not already locally available (see element 584); and (8) a resource version element which may be used to determine whether previously-cached versions should be reloaded. The syntax and treatment of these optional elements in the response parcel is analogous to that which has been described above with reference to FIGS. 5A and 5B.

In the example response parcel 550, 2 parcel elements 560 and 580 are provided. These provide output data which corresponds to parcel elements 510, 530 of request parcel 500. The first and second output data elements 562, 564 of parcel element 560 provide a retrieved phone number for the person identified in the corresponding phone book lookup request; the third data element 566 contains a status message indicating that this person's entry could not be found. Parcel element 580 contains a response to the book order request 540, indicating that the order executed successfully and that the payment amount is $12.34.

Furthermore, parcel element 580 includes demonstrates how code may be dynamically propagated which, in this example, provides for tracking the status of this order. The code which tracks the status has the method name "bookorderstatustracking", as shown at 581, and the resources which are required for executing this code are specified 582 and 583. A URL from which the resources may be obtained is specified at 584. In this example, a tracking number which is to be used by the tracking code has been assigned when the book order of parcel element 530 was processed, and this tracking number is included in the output data at 585. Thus, it can be seen that the technique of the present invention enables response data and code required to process that data to be specified and transmitted in an application-independent manner.

The manner in which the preferred embodiment of the present invention operates to create and process parcels will now be described with reference to the logic depicted in FIGS. 6A and 6B.

The logic which is preferably used for creation of a parcel is illustrated in FIG. 6A. This process is invoked when a sender has a message to be transmitted to a receiver (i.e. a message request, or a message response), and begins (Block 605) by converting a reference to an object or processing code into data elements expressed in a common format for invocation. In the preferred embodiment, this common format is the XML format illustrated in FIGS. 5A–5C. When a request parcel is being created for retrieving an object, then the reference is an identifier of the object, such as its class name and a set of input property values. When a request parcel is being created for processing an object, then the reference further includes an identifier for the processing code, such as its class and method name. (See elements 510 and 530 of FIGS. 5A and 5B for examples.) When a response parcel is being created, then the reference preferably comprises a set of output property values which were obtained from execution of a request parcel. (See element 560 of FIG. 5C for an example.) If the response parcel needs further application-specific or object-specific processing by the receiver, then the parcel also comprises an identification of the processing code to be used for that purpose. (See element 580 of FIG. 5C.) When multiple occurrences of the same service are to be performed on the same object in a request or response parcel, these multiple occurrences may be packaged together as multiple data elements within a parcel element. (See element 520 of FIG. 5A and elements 562, 564, 566 of FIG. 5C for examples of this technique.)

As has been stated, the receiver of a request or response parcel uses the identified references, which in the preferred embodiment comprises one or more resource specifications, to determine whether the associated code for processing the request or response is locally available, and downloads it if not. The logic with which this may be performed is described below with reference to FIG. 6B.

At Block 610, the syntax elements created in Block 605 are added to the package which is being created for an outgoing parcel. Block 615 then tags the element with the code that is needed to process it, if any. (See elements 511–514 and 531–534 of FIGS. 5A and 5B for examples of these tags.) The processing of Blocks 605 through 615 may be repeated if multiple data elements are being packaged together. The common header information (specifying the priority and delivery times) is added to the package, using values which are particular to the request or response being packaged. (Preferably, the values to be used are passed as input parameters to the code implementing the logic of FIG. 6A.)

In an optional feature of the present invention, Block 620 sets a mirroring policy for each downloaded object and downloaded code module contained in the outgoing parcel. In the preferred embodiment, this comprises setting the value of the resource version element such that it indicates whether a new version should be obtained, to supersede any previously-cached version available to the local system. In addition, a life-span value is preferably conveyed for each downloaded object and code module. In one aspect, this life-span value may be set in the outgoing package using a special tag (not shown in FIG. 5), where the tag value expresses the life-span in an implementation-dependent manner (such as an absolute date and time of expiration, or a relative expiration time), indicating when the downloaded information is to be purged from the local system. In this manner, the originator of the object and code propagation parcel can control how long the propagated information remains at its destination, and relieves the receiver from the burden of providing this maintenance function. In another aspect, the life-span value may be controlled by a caching policy, which may be system-specific or object-specific (e.g. by setting an object property to reflect the life-span), wherein a method is provided which periodically inspects cached objects to determine whether the life-span duration has been exceeded and deletes the objects if so.

The outgoing package is then sent to its target destination. In the preferred embodiment, this comprises issuing an MQPUT call to send the package to a message queue at the destination, as described above with reference to FIGS. 3 and 4.

The logic which is preferably used for receiving, unpackaging, and processing a parcel is illustrated in FIG. 6B. In the preferred embodiment, this process is invoked upon removing a parcel from an incoming message queue using an MQGET call, and begins (Block 630) by sending an acknowledgement of the parcel receipt to its sender. (Note that this is not meant to imply a synchronous execution mode, but merely that the queued message has been received at its target. Furthermore, this acknowledgement may occur much later than the actual receipt of the queued message, for example when delayed processing is involved.) The parcel is then unpackaged (Block 635). This comprises determining which parcel elements are contained in the package. The object and/or code references for each parcel element are then located in the appropriate resource tags (Block 640).

Block 645 determines whether the object(s) and/or code need to be downloaded. In the preferred embodiment, this comprises first checking the resource identifiers to determine whether a previously-cached resource (for an object or code, as appropriate) already exists on the local system. In the case of an object, the technique described in the related inventions may be used for this purpose. The technique described in Ser. No. 09/518,474, filed Mar. 3, 2000, which is titled "Caching Dynamic Content", may be used as an alternative. In general, these techniques comprise using an object identifier in combination with a set of input property values as an index or key to access a cache of objects. Preferably, the caching policy operates to invalidate cached objects independently of receiving request and response parcels which use those objects. If the policy for a cached object indicates that the object is stale, then the object is preferably purged from the cache. In a similar manner, the life span value which may be set for a resource retrieved through use of the present invention is preferably checked periodically, as stated earlier, to determine whether the resource's life span has been exceeded; when the life span has been exceeded, the resources are preferably purged from local storage. Therefore, the preferred embodiment assumes that resources which are found on the local system are not invalidated by the caching policy and have not exceeded their life span. (Alternatively, these conditions may be checked explicitly when determining whether a resource is locally available for use with a parcel.)

When a resource (i.e. an object or code) specified in a resource element of a parcel, was not located in the cache, then the associated URL from the parcel is used to retrieve a (first) copy.

If a required object or code segment specified as a resource in the parcel is located on the local system, on the other hand, its resource version value is checked to determine whether it has become obsolete and therefore must be reloaded. A fresh copy must be downloaded if the resource version value specified in the resource element is greater than the resource version of the locally-stored resource. Block 650 performs the download operation, when the test in Block 645 has a positive result, and Block 655 then sets the new life-span value for this downloaded resource. Note that the life-span value can be used to cause downloaded resources to remain resident at a particular system for a predetermined period of time. This facilitates on-the-fly creation of mirroring sites for offloading of work requests, where the offloading process does not result in addition of a significant amount of processing overhead to the target site: that is, because the downloaded resources are made to stay resident, each downloaded request for a particular service does not result in a large amount of network traffic to obtain the necessary code, because it has already been installed as a result of processing the first such downloaded request.

The downloaded objects and code segments could be invoked either stand-alone or under a common launcher. A common launcher can be downloaded first without any data element. The object and code segment resource tags can subsequently indicate that they need to start from the launcher. The resource tags can be optionally included in a parcel element after an object or code segment has been pushed out. The <servicename>tag is sufficient to identify the objects or code segments needed in normal processing until a new version needs to be pushed out again.

The processing code which is required to process the request or response from the incoming parcel is then invoked (Block 660). This may comprise simply invoking a browser for rendering a Web document returned as a response parcel, or it may comprise invoking code which has been explicitly specified as a resource within the parcel. That invocation operates on the content of the corresponding data element in the parcel (Block 665). Blocks 640 through 665 are repeated for each element in the parcel, and Blocks 660 and 665 are invoked for each data element therein. After this processing is complete, control is returned to the logic from which FIG. 6B was invoked.

As has been demonstrated, the present invention provides a novel technique that enables new application software to be deployed dynamically from a single site in a distributed computing environment in an application-independent manner. This technique uses a flexible, simple data and process interaction model which self-propagates throughout the network as needed, thereby facilitating the expansion of business-to-business and business-to-consumer information exchanges. The process which initiates the propagation may control the life-span of the downloaded code and/or objects.

The technique of the present invention may be used for operating according to a novel application model wherein all sender and receiver parts of paired applications are deployed from one origin. This technique also provides for a novel application model wherein specific data and code required to process that data are stored on the same device, and are deployed therefrom to other devices. In this manner, data formatting and processing requirements which are imposed on a message receiver may be automatically resolved by transmitting a widely-accepted syntax which identifies the required code segments as well as a location from which they may be retrieved.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modifications as fall within the spirit and scope of the invention.

What is claimed is:

1. A computer program product for enabling software objects and applications to dynamically self-propagate through a computing network, the computer program product embodied on one or more computer-readable media and comprising:

computer-readable program code means for creating, by a requester, a request parcel comprising input data for processing a request from the requester and an identification of, and location information for, one or more first code segments required for processing the input data by a receiver of the request parcel;

computer-readable program code means for sending the request parcel from the requester to the receiver over the computing network;

computer-readable program code means for receiving the sent request parcel at the receiver;

computer-readable program code means for determining, by the receiver, whether the identified first code segments in the received request parcel are locally available to the receiver, and for obtaining them using the location information in the request parcel if not, so that they become locally available to the receiver;

computer-readable program code means for processing the request, by the receiver, using the input data and the locally available first code segments, thereby creating output data as a response to the received request;

computer-readable program code means for creating, by the receiver, a response parcel comprising the output data for the response and an identification of, and location information for, zero or more second code segments required for processing the output data by the requester;

computer-readable program code means for sending the response parcel from the receiver to the requester over the computing network;

computer-readable program code means for receiving the sent response parcel at the requester;

computer-readable program code means for determining, by the requester, whether the identified second code segments in the received response parcel, if any, are locally available to the requester, and for obtaining them using the location information in the response parcel if not, so that they become locally available to the requester; and computer-readable program code means for processing, by the requester, the output data for the response using, when specified in the response parcel, the locally available second code segments.

2. The computer program product according to claim 1, wherein the computer-readable program code means for sending the request and response parcels and the computer-readable program code means for receiving the request and response parcels use a message queuing system.

3. The computer program product according to claim 1, wherein the request parcel and the response parcel are specified using a markup language.

4. The computer program product according to claim 3, wherein the markup language is Extensible Markup Language (XML).

5. The computer program product according to claim 1, wherein each of the request parcel and the response parcel may further comprise an identification of, and location information for, one or more software objects which are to be stored at the receiver and the requester, respectively, and further comprising computer-readable program code means for determining whether the identified software objects are locally stored at the receiver and the requester, respectively, and for obtaining them using the location information if not.

6. The computer program product according to claim 1, wherein the request parcel may comprise a plurality of processing requests and the response parcel may comprise a plurality of processing responses, and wherein each processing request and processing response specifies an identifier which enables correlating a particular processing request with its associated processing response.

7. The computer program product according to claim 1, wherein either or both of the request parcel and response parcel specify a life span for the identified first and second code segments, and further comprising:

computer-readable program code means for removing the identified first code segments from local storage of the receiver when the life span of the first code segments is exceeded; and computer-readable program code means for removing the identified second code segments from local storage of the requester when the life span of the second code segments is exceeded.

8. The computer program product according to claim 1, further comprising:
   computer-readable program code means for comparing, by the receiver, when the computer-readable program code means for determining whether the first code segments are locally available has a positive result, whether a first resource version specified in the request parcel indicates that the locally available first code segments must be reloaded, and for reloading them, by the receiver, using the location information in the request parcel if so; and
   computer-readable program code means for comparing, by the requester, when the computer-readable program code means for determining whether the second code segments are locally available has the positive result, whether a second resource version specified in the response parcel indicates that the locally available second code segments must be reloaded, and for reloading them, by the requester, using the location information in the response parcel if so.

9. A system for enabling software objects and applications to dynamically self-propagate through a computing network, comprising:
   means for creating, by a requester, a request parcel comprising input data for processing a request from the requester and an identification of, and location information for, one or more first code segments required for processing the input data by a receiver of the request parcel;
   means for sending the request parcel from the requester to the receiver over the computing network;
   means for receiving the sent request parcel at the receiver;
   means for determining, by the receiver, whether the identified first code segments in the received request parcel are locally available to the receiver, and for obtaining them using the location information in the request parcel if not, so that they become locally available to the receiver;
   means for processing the request, by the receiver, using the input data and the locally available first code segments, thereby creating output data as a response to the received request;
   means for creating, by the receiver, a response parcel comprising the output data for the response and an identification of, and location information for, zero or more second code segments required for processing the output data by the requester;
   means for sending the response parcel from the receiver to the requester over the computing network;
   means for receiving the sent response parcel at the requester;
   means for determining, by the requester, whether the identified second code segments in the received response parcel, if any, are locally available to the requester, and for obtaining them using the location information in the response parcel if not, so that they become locally available to the requester; and
   means for processing, by the requester, the output data for the response using, when specified in the response parcel, the locally available second code segments.

10. The system according to claim 9, wherein the means for sending the request and response parcels and the means for receiving the request and response parcels use a message queuing system.

11. The system according to claim 9, wherein the request parcel and the response parcel are specified using a markup language.

12. The system according to claim 11, wherein the markup language is Extensible Markup Language (XML).

13. The system according to claim 9, wherein each of the request parcel and the response parcel may further comprise an identification of, and location information for, one or more software objects which are to be stored at the receiver and the requester, respectively, and further comprising means for determining whether the identified software objects are locally stored at the receiver and the requester, respectively and for obtaining them using the location information if not.

14. The system according to claim 9, wherein the request parcel may comprise a plurality of processing requests and the response parcel may comprise a plurality of processing responses, and wherein each processing request and processing response specifies an identifier which enables correlating a particular processing request with its associated processing response.

15. The system according to claim 9, wherein either or both of the request parcel and response parcel specify a life span for the identified first and second code segments, and further comprising:
   means for removing the identified first code segments from local storage of the receiver when the life span of the first code segments is exceeded; and
   means for removing the identified second code segments from local storage of the requester when the life span of the second code segments is exceeded.

16. The system according to claim 9, further comprising:
   means for comparing, by the receiver, when the means for determining whether the first code segments are locally available has a positive result, whether a first resource version specified in the request parcel indicates that the locally available first code segments must be reloaded, and for reloading them, by the receiver, using the location information in the request parcel if so; and
   means for comparing, by the requester, when the means for determining whether the second code segments are locally available has the positive result, whether a second resource version specified in the response parcel indicates that the locally available second code segments must be reloaded, and for reloading them, by the requester, using the location information in the response parcel if so.

17. A method for enabling software objects and applications to dynamically self-propagate through a computing network, comprising the steps of:
   creating, by a requester, a request parcel comprising input data for processing a request from the requester and an identification of, and location information for, one or more first code segments required for processing the input data by a receiver of the request parcel;
   sending the request parcel from the requester to the receiver over the computing network;
   receiving the sent request parcel at the receiver;
   determining, by the receiver, whether the identified first code segments in the received request parcel are locally available to the receiver, and for obtaining them using the location information in the request parcel if not, so that they become locally available to the receiver;
   processing the request, by the receiver, using the input data and the locally available first code segments, thereby creating output data as a response to the received request;
   creating, by the receiver, a response parcel comprising the output data for the response and an identification of, and location information for, zero or more second code segments required for processing the output data by the requester;

sending the response parcel from the receiver to the requester over the computing network;

receiving the sent response parcel at the requester;

determining, by the requester, whether the identified second code segments in the received response parcel, if any, are locally available to the requester, and for obtaining them using the location information in the response parcel if not, so that they become locally available to the requester; and processing, by the requester, the output data for the response using, when specified in the response parcel, the locally available second code segments.

18. The method according to claim 17, wherein the step of sending the request and response parcels and the step of receiving the request and response parcels use a message queuing system.

19. The method according to claim 17, wherein the request parcel and the response parcel are specified using a markup language.

20. The method according to claim 19, wherein the markup language is Extensible Markup Language (XML).

21. The method according to claim 17, wherein each of the request parcel and the response parcel may further comprise an identification of, and location information for, one or more software objects which are to be stored at the receiver and the requester, respectively, and further comprising the step of determining whether the identified software objects are locally stored at the receiver and the requester respectively and for obtaining them using the location information if not.

22. The method according to claim 17, wherein the request parcel may comprise a plurality of processing requests and the response parcel may comprise a plurality of processing responses, and wherein each processing request and processing response specifies an identifier which enables correlating a particular processing request with its associated processing response.

23. The method according to claim 17, wherein either or both of the request parcel and response parcel specify a life span for the identified first and second code segments, and further comprising the steps of:

removing the identified first code segments from local storage of the receiver when the life span of the first code segments is exceeded; and removing the identified second code segments from local storage of the requester when the life span of the second code segments is exceeded.

24. The method according to claim 17, further comprising the steps of:

comparing, by the receiver, when the step of determining whether the first code segments are locally available has a positive result, whether a first resource version specified in the request parcel indicates that the locally available first code segments must be reloaded, and reloading them, by the receiver, using the location information in the request parcel if so; and comparing, by the requester, when the step of determining whether the second code segments are locally available has the positive result, whether a second resource version specified in the response parcel indicates that the locally available second code segments must be reloaded, and reloading them, by the requester, using the location information in the response parcel if so.

25. A method for dynamically establishing a mirroring site to which processing of work elements can be offloaded from another site, comprising the steps of:

creating, by a requester, a request parcel comprising input data for processing a request from the requester and an identification of, and location information for, one or more first code segments required for processing the input data by a receiver of the request parcel;

sending the request parcel from the requester to the receiver over the computing network;

receiving the sent request parcel at the receiver;

determining, by the receiver, whether the identified first code segments in the received request parcel are locally available to the receiver, and for obtaining them using the location information in the request parcel if not, so that they become locally available to the receiver;

processing the request, by the receiver, using the input data and the locally available first code segments, thereby creating output data as a response to the received request;

creating, by the receiver, a response parcel comprising the output data for the response and an identification of, and location information for, zero or more second code segments required for processing the output data by the requester;

sending the response parcel from the receiver to the requester over the computing network;

receiving the sent response parcel at the requester;

determining, by the requester, whether the identified second code segments in the received response parcel, if any, are locally available to the requester, and for obtaining them using the location information in the response parcel if not, so that they become locally available to the requester; and processing, by the requester, the output data for the response using, when specified in the response parcel, the locally available second code segments.

26. The method according to claim 25, wherein either or both of the request parcel and response parcel specify a life span for the identified first and second code segments, and further comprising the steps of:

removing the identified first code segments from local storage of the receiver when the life span of the first code segments is exceeded; and removing the identified second code segments from local storage of the requester when the life span of the second code segments is exceeded.

27. The method according to claim 25, further comprising the steps of:

comparing, by the receiver, when the step of determining whether the first code segments are locally available has a positive result, whether a first resource version specified in the request parcel indicates that the locally available first code segments must be reloaded, and reloading them, by the receiver, using the location information in the request parcel if so; and comparing, by the requester, when the step of determining whether the second code segments are locally available has the positive result, whether a second resource version specified in the response parcel indicates that the locally available second code segments must be reloaded, and reloading them, by the requester, using the location information in the response parcel if so.

28. The method according to claim 25, wherein the request in the request parcel is one of (1) a refresh request for a read-access object, or (2) an update request for performing an update of a stored object.

29. A system for dynamically establishing a mirroring site to which processing of work elements can be offloaded from another site, comprising:

means for creating, by a requester, a request parcel comprising input data for processing a request from the requester and an identification of, and location information for, one or more first code segments required for processing the input data by a receiver of the request parcel;

means for sending the request parcel from the requester to the receiver over the computing network;

means for receiving the sent request parcel at the receiver;

means for determining, by the receiver, whether the identified first code segments in the received request parcel are locally available to the receiver, and for obtaining them using the location information in the request parcel if not, so that they become locally available to the receiver;

means for processing, by the receiver, the request using the input data and the locally available first code segments, thereby creating output data as a response to the received request;

means for creating, by the receiver, a response parcel comprising the output data for the response and an identification of, and location information for, zero or more second code segments required for processing the output data by the requester;

means for sending the response parcel from the receiver to the requester over the computing network;

means for receiving the sent response parcel at the requester;

means for determining, by the requester, whether the identified second code segments in the received response parcel, if any, are locally available to the requester, and for obtaining them using the location information in the response parcel if not, so that they become locally available to the requester; and means for processing, by the requester, the output data for the response using, when specified in the response parcel, the locally available second code segments.

30. The system according to claim 29, wherein either or both of the request parcel and response parcel specify a life span for the identified first and second code segments, and further comprising:

means for removing the identified first code segments from local storage of the receiver when the life span of the first code segments is exceeded; and means for removing the identified second code segments from local storage of the requester when the life span of the second code segments is exceeded.

31. The system according to claim 29, further comprising:

means for comparing, by the receiver, when the means for determining whether the first code segments are locally available has a positive result, whether a first resource version specified in the request parcel indicates that the locally available first code segments must be reloaded, and reloading them, by the receiver, using the location information in the request parcel if so; and means for comparing, by the requester, when the means for determining whether the second code segments are locally available has the positive result, whether a second resource version specified in the response parcel indicates that the locally available second code segments must be reloaded, and reloading them, by the requester, using the location information in the response parcel if so.

32. The system according to claim 29, wherein the request in the request parcel is one of (1) a refresh request for a read-access object, or (2) an update request for performing an update of a stored object.

33. A computer program product for dynamically establishing a mirroring site to which processing of work elements can be offloaded from another site, the computer program product embodied on one or more computer-readable media and comprising:

computer-readable program code means for creating, by a requester, a request parcel comprising input data for processing a request from the requester and an identification of, and location information for, one or more first code segments required for processing the input data by a receiver of the request parcel;

computer-readable program code means for sending the request parcel from the requester to the receiver over the computing network;

computer-readable program code means for receiving the sent request parcel at the receiver;

computer-readable program code means for determining, by the receiver, whether the identified first code segments in the received request parcel are locally available to the receiver, and for obtaining them using the location information in the request parcel if not, so that they become locally available to the receiver;

computer-readable program code means for processing the request, by the receiver, using the input data and the locally available first code segments, thereby creating output data as a response to the received request;

computer-readable program code means for creating, by the receiver, a response parcel comprising the output data for the response and an identification of, and location information for, zero or more second code segments required for processing the output data by the requester;

computer-readable program code means for sending the response parcel from the receiver to the requester over the computing network;

computer-readable program code means for receiving the sent response parcel at the requester;

computer-readable program code means for determining, by the requester, whether the identified second code segments in the received response parcel, if any, are locally available to the requester, and for obtaining them using the location information in the response parcel if not, so that they become locally available to the requester; and computer-readable program code means for processing, by the requester, the output data for the response using, when specified in the response parcel, the locally available second code segments.

34. The computer program product according to claim 33, wherein either or both of the request parcel and response parcel specify a life span for the identified first and second code segments, and further comprising:

computer-readable program code means for removing the identified first code segments from local storage of the receiver when the life span of the first code segments is exceeded; and computer-readable program code means for removing the identified second code segments from local storage of the requester when the life span of the second code segments is exceeded.

35. The computer program product according to claim 33, further comprising:

computer-readable program code means for comparing, by the receiver, when the computer-readable program code means for determining whether the first code segments are locally available has a positive result, whether a first resource version specified in the request parcel indicates that the locally available first code segments must be reloaded, and reloading them, by the receiver, using the location information in the request parcel if so; and computer-readable program code means for comparing, by the requester, when the computer-readable program code means for determining whether the second code segments are locally available has the positive result, whether a second resource version specified in the response parcel indicates that the locally available second code segments must be reloaded, and reloading them, by the requester, using the location information in the response parcel if so.

36. The computer program product according to claim 33, wherein the request in the request parcel is one of (1) a refresh request for a read-access object, or (2) an update request for performing an update of a stored object.

37. A method of dynamically propagating code, comprising steps of:

creating a request parcel, by a requester that will request a service from a remote receiver, wherein the request parcel identifies the service as well as an identification of, and location information for, executable resources that will be required for performing the service at the remote receiver, wherein the identification and location information are usable by the remote receiver for obtaining the required executable resources if they are not already available to the remote receiver; and sending the request parcel from the requester to the remote receiver.

38. A method of establishing a mirroring site to which processing of requests can be offloaded from a request receiver, comprising steps of:

creating a request parcel, by a requester that will request a service from a remote receiver, wherein the request parcel identifies the service as well as an identification of, and location information for, executable resources that will be required for performing the service at the remote receiver, wherein the identification and location information are usable by the remote receiver for obtaining the required executable resources if they are not already available to the remote receiver;

sending the request parcel from the requester to the remote receiver;

receiving the request parcel at the remote receiver; and forwarding the received request parcel from the remote receiver to a different remote receiver, whereby the identification and location information are equally usable by the different remote receiver for obtaining the required executable resources if they are not already available to the different remote receiver.

* * * * *